Figures 1, 2:
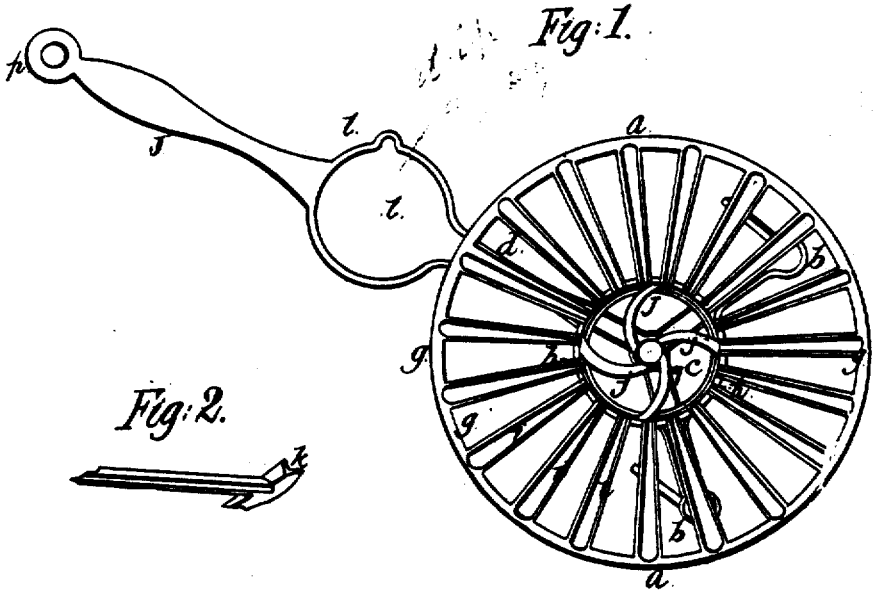

NO PRINTED SPECIFICATION AVAILABLE.

5-62

61×

Bush & Pratt,

Gridiron.

Reissued Sept. 17. 1834

H. PETERS, PHOTO-LITHOGRAPHER, WASH.

United States Patent Office

PTO - BOYERS, PA Duty Station

MISSING PAGE TEMPORARY NOTICE

RX 61

TENT # 61 X FOR ISSUE DATE 9-17-1934

S BEEN SCANNED, BUT WITH MISSING PAGE(S). UPON RECEIVING OF

SSING PAGE(S), THE ENTIRE DOCUMENT WILL BE RESCANNED. PLEASE

LL THE OFFICE OF DATA BASE ADMINISTRATION AT (703) 308-0555 IF

HAVE A QUESTION.

S NOTICE IS FOR THE MISSING PAGE CONTAINING:

pg. 2 thru end

Data Conversion Operation

Boyers, Pa